United States Patent
Tsuruta et al.

(10) Patent No.: US 7,547,130 B2
(45) Date of Patent: Jun. 16, 2009

(54) LIGHT GUIDE PLATE AND BACKLIGHT UNIT USING THE SAME

(75) Inventors: Kenichi Tsuruta, Fujiyoshida (JP); Masaki Furuya, Fujiyoshida (JP)

(73) Assignee: Citizen Electronics Co., Ltd., Yamanashi-Ken ( * ) Notice: Subject to any disclaimer, the term of this patent is extended or adjusted under 35 U.S.C. 154(b) by 75 days.

(21) Appl. No.: 11/829,530

(22) Filed: Jul. 27, 2007

(65) Prior Publication Data

US 2008/0025046 A1    Jan. 31, 2008

(30) Foreign Application Priority Data

Jul. 28, 2006    (JP) .............................. 2006-206451

(51) Int. Cl.
*F21V 7/04*    (2006.01)
(52) U.S. Cl. ...................... 362/627; 362/612; 362/615; 349/65; 385/901
(58) Field of Classification Search .................. 362/612, 362/615, 621, 622, 627; 349/65; 385/146, 385/901

See application file for complete search history.

(56) References Cited

U.S. PATENT DOCUMENTS 5,126,882 A    6/1992  Oe 6,921,178 B2 *    7/2005  Ohkawa ...................... 362/612
2005/0248695 A1    11/2005  Miyashita

FOREIGN PATENT DOCUMENTS

| JP | 2001-6418 A | 1/2001 |
| JP | 2006-134594 A | 5/2006 |

* cited by examiner

*Primary Examiner*—Stephen F Husar
(74) *Attorney, Agent, or Firm*—Brinks Hofer Gilson & Lione

(57) ABSTRACT

A light guide plate having a light-emitting surface with reduced luminance unevenness and a backlight unit using the light guide plate are provided. The light guide plate has a light entrance surface with two opposite lateral edges and a pair of widthwise edges extending between the lateral edges. Two opposite side surfaces extend from the lateral edges of the light entrance surface substantially at right angles to the light entrance surface. A light exit surface extends from one of the widthwise edges substantially at right angles to the light entrance surface. The light guide plate further has a surface opposite to the light exit surface that extends from the other of the widthwise edges. The side surfaces have respective light-scattering regions near the light entrance surface to scatter and reflect light entering the light guide plate through the light entrance surface and reaching the light-scattering regions.

8 Claims, 8 Drawing Sheets

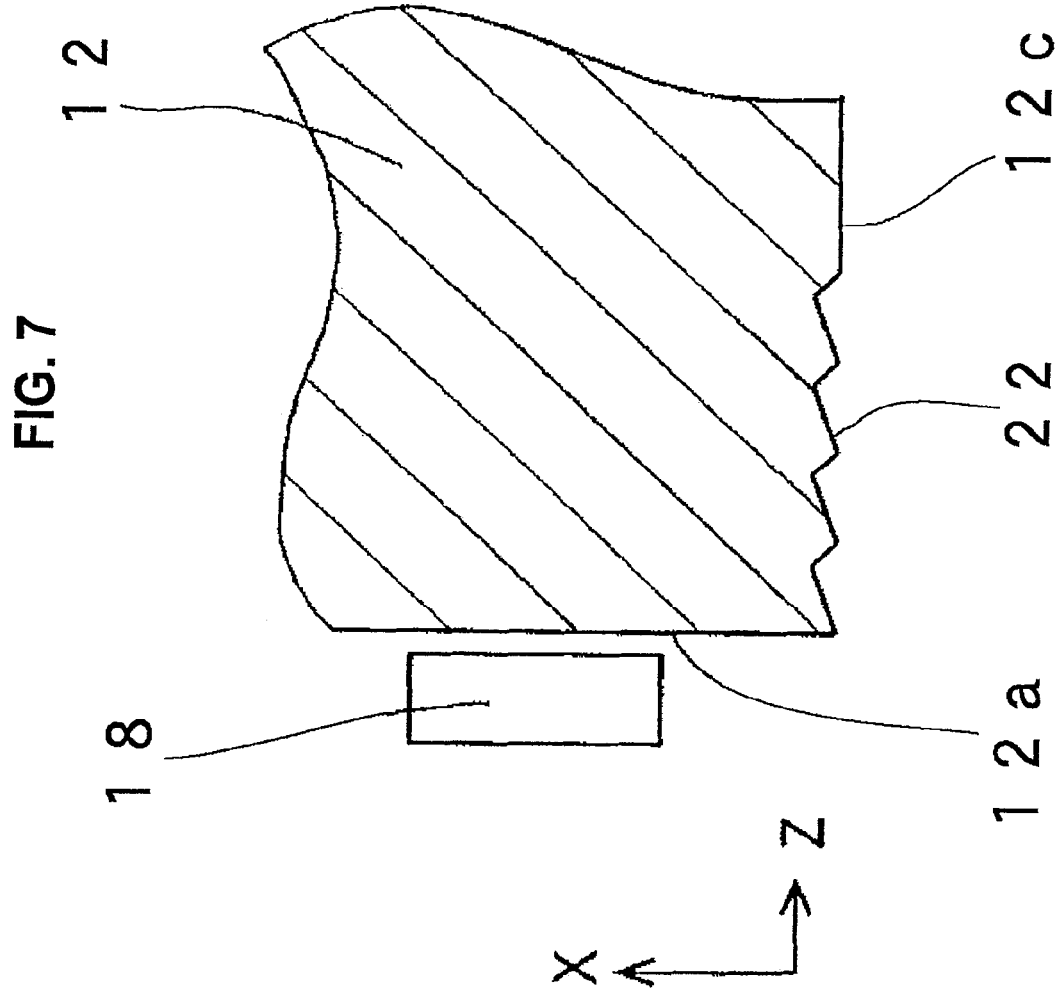

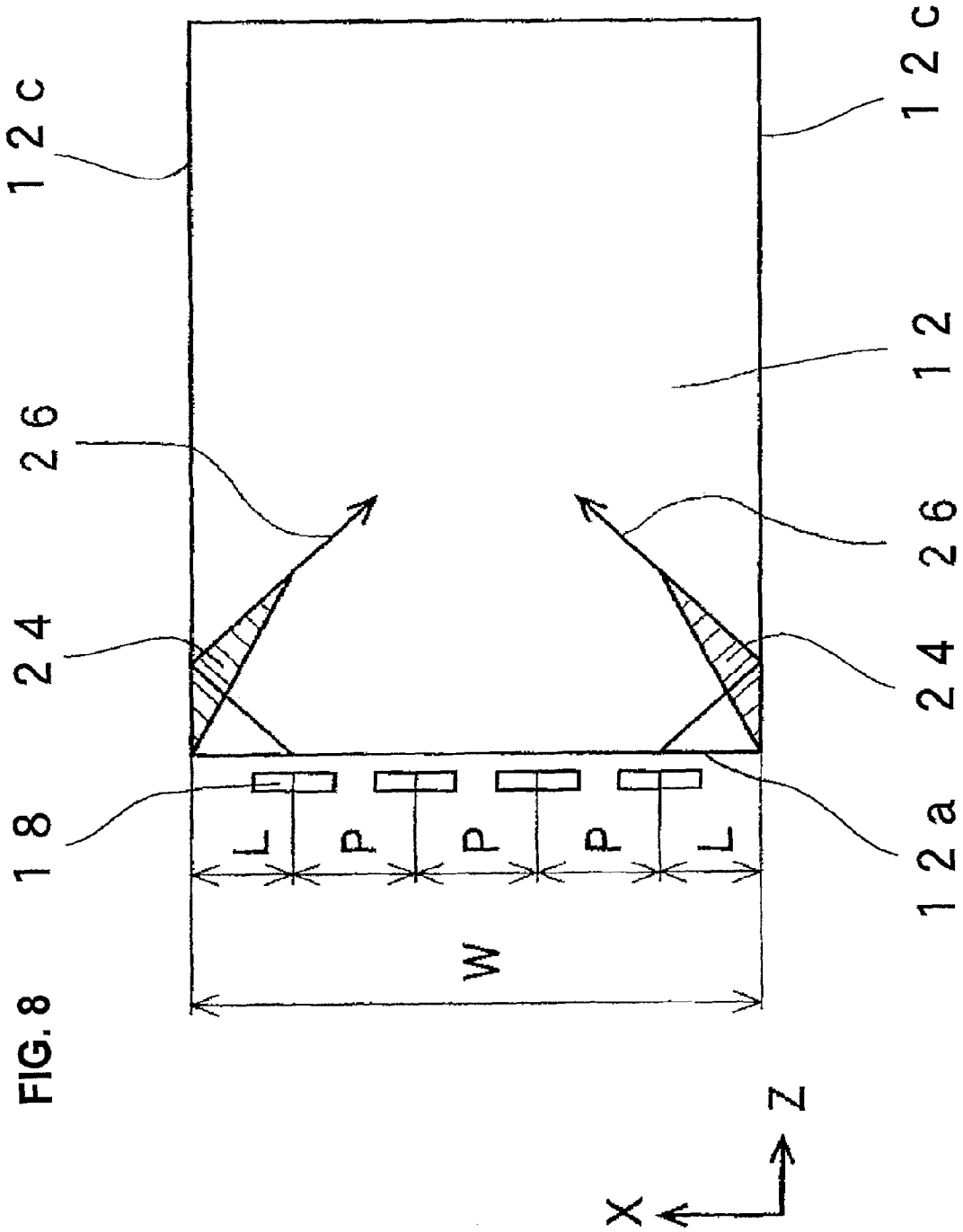

LIGHT GUIDE PLATE AND BACKLIGHT UNIT USING THE SAME

This application claims priority under 35 U.S.C. § 119 to Japanese Patent Application No. JP2006-206451 filed Jul. 28, 2006, the entire content of which is hereby incorporated by reference.

BACKGROUND OF THE INVENTION

1. Field of the Invention

The present invention relates to a light guide plate serving as a planar light-emitting device disposed at the back of a transmissive or semitransmitting reflective liquid crystal display panel and also relates to a backlight unit using the light guide plate.

2. Description of the Related Arts

A backlight unit for a liquid crystal display panel is disclosed, for example, in Japanese Patent Application Publication No. Hei 2-17. This backlight unit includes a tabular light guide plate having an elongated rectangular light entrance surface and a light exit surface extending at right angles to the light entrance surface, and a cold-cathode tube provided along the light entrance surface as a linear light source. In the light guide plate, light from the cold-cathode tube is received through the light entrance surface and emitted from the light exit surface.

There has also been developed a backlight unit having a light guide plate similar to the above and using as a light source a plurality of light-emitting diodes disposed along the light entrance surface of the light guide plate (for example, see Japanese Patent Application Publication No. 2005-317474).

Light-emitting diodes consume less electric power than cold-cathode tubes. Accordingly, the latter backlight unit is superior to the former in terms of electric power consumption. As shown in FIG. 8, however, light-emitting diodes 18 are spaced from each other in the width direction W of a light entrance surface 12a of a light guide plate 12 at a pitch P. Therefore, light cannot sufficiently reach a region on the light guide plate 12 corresponding to a space between each pair of adjacent light-emitting diodes 18, and this region is likely to become dark. This problem may be solved by reducing the pitch P between the light-emitting diodes 18, for example. Although if the light-emitting diode pitch P is reduced, the above-stated problems will be solved, it becomes impossible for sufficient light to reach regions around two opposite side surfaces 12c of the light guide plate 12 near the light-emitting diodes 18. Consequently, the hatched regions of the light guide plate 12 in FIG. 18 appear dark unfavorably.

SUMMARY OF THE INVENTION

Accordingly, an object of the present invention is to provide a substantially uniform luminance distribution over the entire area of the light exit surface of the light guide plate, without occurrence of dark regions as stated above.

That is, the present invention provides a light guide plate having an upper surface, a lower surface opposite to the upper surface, and a peripheral edge surface between the respective peripheral edges of the upper and lower surfaces. The peripheral edge surface has a light entrance surface, two opposite side surfaces extending from opposite lateral side edges of the light entrance surface substantially normal to the light entrance surface, and an opposite surface opposite to the light entrance surface. The side surfaces have respective light-scattering regions near the light entrance surface to scatter and reflect light entering the light guide plate through the light entrance surface and reaching the light-scattering regions.

In this light guide plate, the light-scattering regions allow light entering the light guide plate and reaching them to be scattered and reflected toward the light entrance surface. Accordingly, the occurrence of the above-described dark regions can be suppressed and, thus, it is possible to provide a substantially uniform luminance distribution over the entire area of the light exit surface of a backlight unit using this light guide plate.

The light-scattering regions may be coarse surfaces. Alternatively, the light-scattering regions may be white printed surfaces.

Specifically, the light-scattering regions may be formed in respective regions of the side surfaces that extend over a predetermined length from the lateral edges of the light entrance surface.

In addition, the present invention provides a backlight unit including a light guide plate arranged as stated above and a plurality of light-emitting diodes provided to face the light entrance surface and spaced from each other in the width direction of the light entrance surface to apply light to the light entrance surface.

Preferably, the backlight unit is arranged as follows. The light-scattering regions are formed in respective regions of the side surfaces that extend over a predetermined length from the lateral edges of the light entrance surface. The predetermined length is not less than the distance between one of the lateral edges of the light entrance surface and one of the light-emitting diodes that is closest to the one of the lateral edges.

The above and other objects, features and advantages of the present invention will become more apparent from the following description of the preferred embodiments thereof, taken in conjunction with the accompanying drawings.

BRIEF DESCRIPTION OF THE DRAWINGS

FIG. 7 is a fragmentary enlarged sectional view showing a part of a light guide plate and light-emitting diodes of a backlight unit according to a third embodiment of the present invention.

FIG. 8 is a plan view showing a light guide plate and light-emitting diodes to explain a problem associated with a backlight unit according to a related art.

DESCRIPTION OF THE PREFERRED EMBODIMENTS

Embodiments of the backlight unit according to the present invention will be described below with reference to the accompanying drawings.

Figure 1:
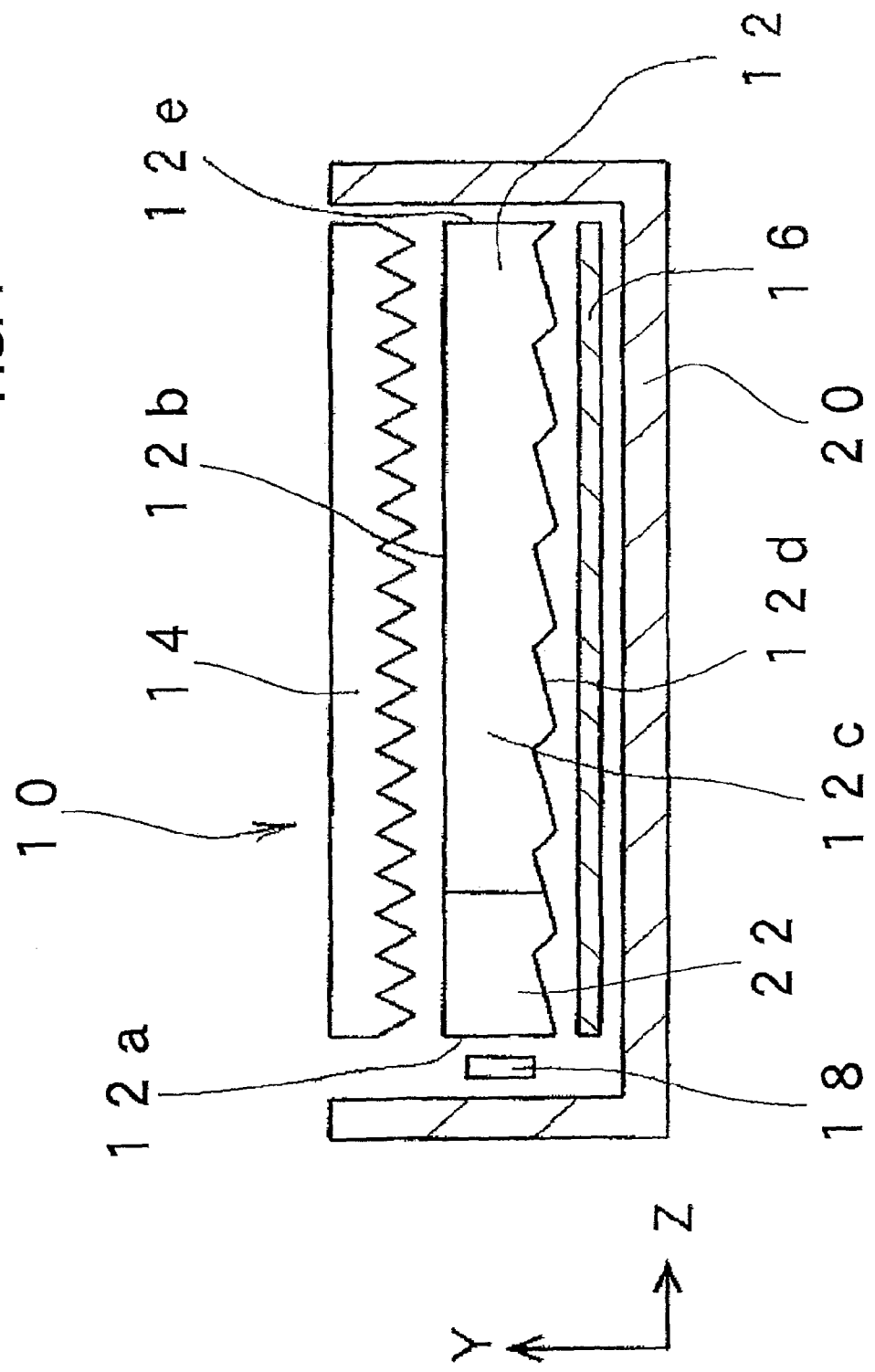
FIG. 1 is a sectional view taken along the line I-I in FIG. 2, showing a backlight unit according to an embodiment of the present invention.
Figure 2:
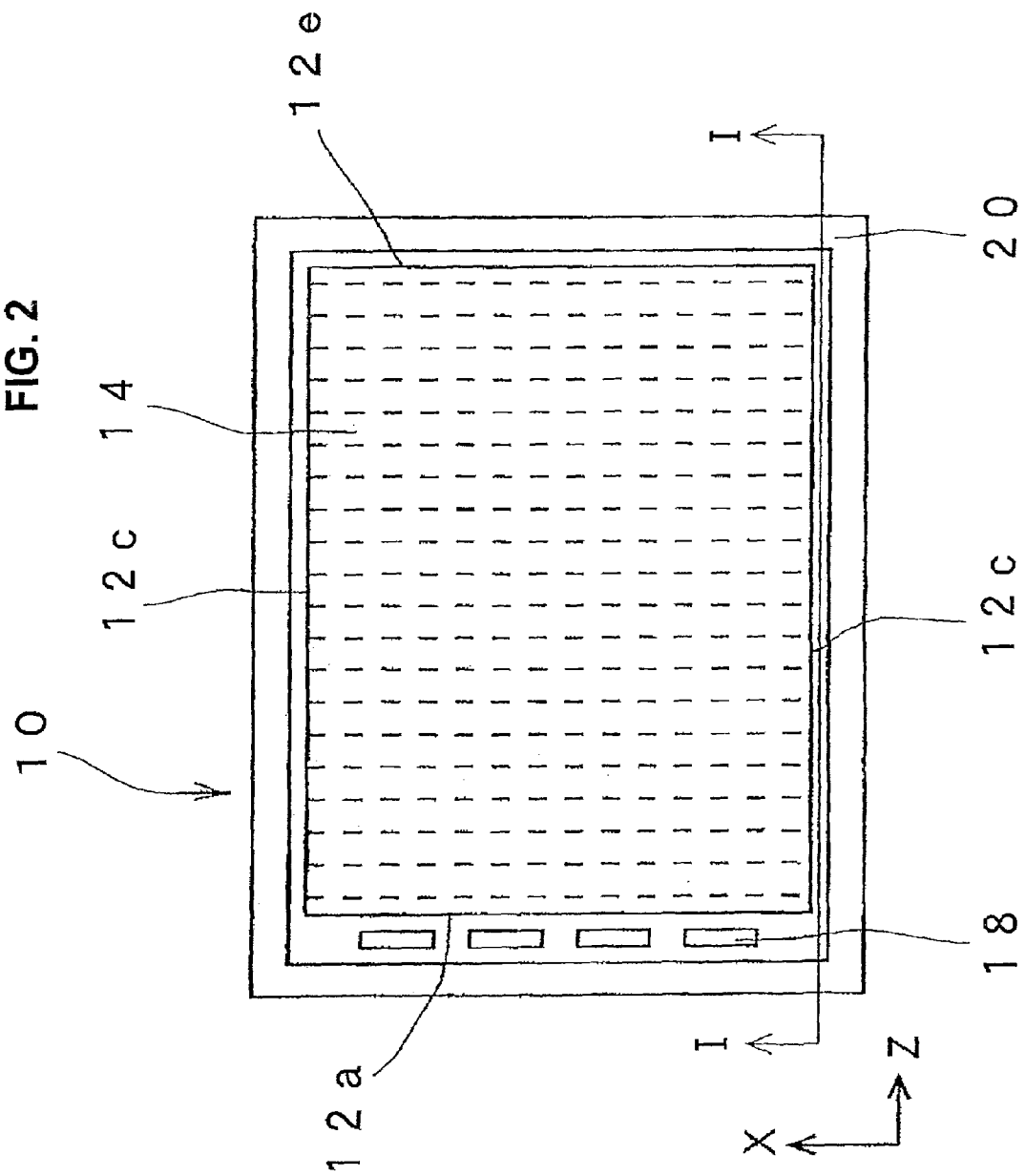
FIG. 2 is a plan view of the backlight unit of FIG. 1.
Figure 3:
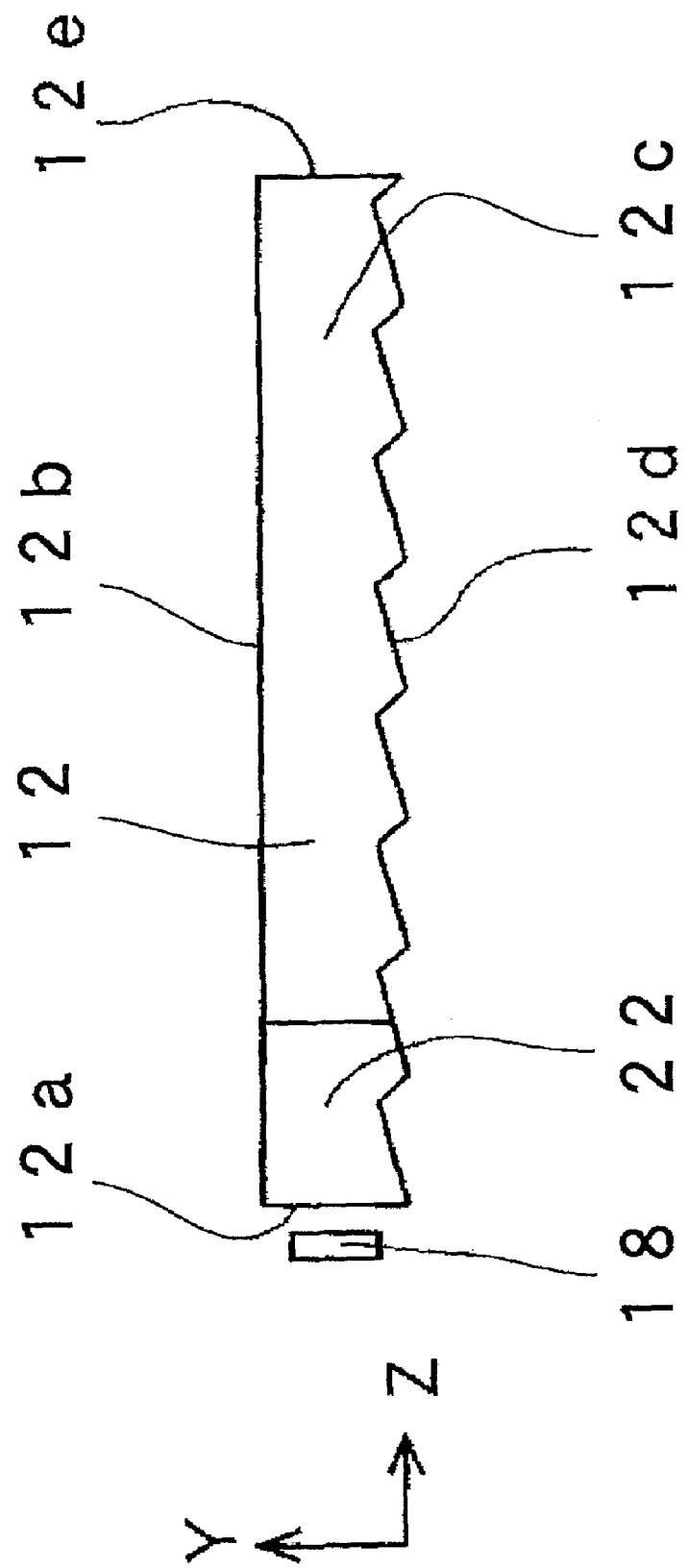
FIG. 3 is a side view showing a light guide plate and light-emitting diodes of the backlight unit according to the present invention.

As shown in FIGS. 1 and 2, a backlight unit 10 according to an embodiment of the present invention has a light guide plate 12. A plurality of light-emitting diodes 18 are disposed to face a light entrance surface 12*a* of the light guide plate 12. A prism sheet 14 is disposed to face a light exit surface 12*b* of the light guide plate 12, which is an upper surface thereof. A reflecting sheet 16 is disposed to face a back surface 12*d* of the light guide plate 12, which is a lower surface thereof. The backlight unit 10 further has a housing 20 that accommodates these constituent elements of the backlight unit 10.

As shown in FIG. 2, a plurality of light-emitting diodes 18 are spaced from each other in the width direction X of the light entrance surface 12*a* of the light guide plate 12. In the illustrated example, the pitch between the light-emitting diodes 18 is smaller than a value obtained by dividing the length of the light entrance surface 12*a* in the width direction thereof by the number of light-emitting diodes 18 used, thereby reducing the occurrence of a dark region in an area on the light guide plate 12 near the light entrance surface 12*a* that corresponds to the space between each pair of adjacent light-emitting diodes 18.

The light guide plate 12 receives light from the light-emitting diodes 18 through the light entrance surface 12*a* and emits the light from the entire area of the light exit surface 12*b*.

The light guide plate 12 may be formed by injection molding or the like using a transparent resin material such as polymethylmethacrylate or polycarbonate.

The light guide plate 12 has a substantially rectangular parallelepiped shape. That is, the light guide plate 12 has the following surfaces: a light entrance surface 12*a* through which light emitted from the light-emitting diodes 18 enters the light guide plate 12; an upper surface serving as a light exit surface 12*b* from which the light entering through the light entrance surface 12*a* exits toward the prism sheet 14; a lower surface 12*d* opposite to the light exit surface 12*b*; a rear surface 12*e* opposite to the light entrance surface 12*a*; and two opposite side surfaces 12*c*.

In the backlight unit 10 of the present invention, the two opposite side surfaces 12*c* have respective light-scattering regions 22 provided adjacent to the light entrance surface 12*a* to scatter and reflect light from the light-emitting diodes 18 entering the light guide plate 12.

The lower surface 12*d* of the light guide plate 12, which is opposite to the light exit surface 12*b*, is provided with a sawtooth profile as seen in the YZ plane. The sawtoothed lower surface 12*d* allows light entering the light guide plate 12 through the light entrance surface 12*a* to gradually exit from the light exit surface 12*b* during travel toward the rear surface 12*e*. Eventually, the light guide plate 12 emits light from the entire area of the light exit surface 12*b*.

The light-scattering regions 22 provided on the opposite side surfaces 12*c* of the light guide plate 12 reflect and scatter light reaching these regions to reduce the occurrence of dark regions (such as those denoted by reference numeral 24 in FIG. 8) in areas on the light guide plate 12 close to the light-scattering regions 22.

The length in the Z axis direction of each light-scattering region 22 extended from the widthwise lateral edge of the light entrance surface 12*a* is set to a size with which the above-described dark region will not occur. As a specific example, the Z axis direction length of each light-scattering region 22 is preferably set to a size not less than the distance (L in FIG. 8) between the widthwise lateral edge of the light entrance surface 12*a* and the light-emitting diode 18 closest to the widthwise lateral edge. For example, a preferable Z axis direction length of the light-scattering region 22 is the sum obtained by adding a length of about 10 mm to 20 mm to the distance L.

Specific examples of each light-scattering region 22 comprise, as will be detailed below, a coarse surface formed by graining or other process. The light-scattering region 22 may also be implemented by providing a white printed layer or forming convex dots or concave dots on the side surface. The light-scattering region 22 may be a surface having a sawtooth cross section.

Graining process can be performed by using sandpaper, sandblasting or the like. If the surface of the light-scattering regions 22 is roughened at a high degree, reflection becomes dominant over scattering. Conversely, if the surface is roughened at a low degree, scattering becomes dominant over reflection. Light scattered and reflected from the light-scattering regions 22 include light that is returned toward the light entrance surface 12*a*. Consequently, the dark regions 24 explained above in connection with FIG. 8 are eliminated or reduced. Thus, it becomes possible to obtain a planar light source excellent in luminance uniformity.

The light-scattering regions 22 comprising white printed layers are formed by kneading particles of white titanium oxide into a coating material and applying the coating material to the two side surfaces 12*c* of the light guide plate 12. The titanium oxide particles may be replaced with glass or silica beads having a diameter of about 10 μm. That is, the light-scattering regions 22 can be formed by applying a coating material having such glass or silica beads kneaded thereinto to the side surfaces 12*c* of the light guide plate 12. The light scattering and reflecting effect can be adjusted according to the particle size of titanium oxide or glass or silica beads contained in the white printed layers. If the particle size of titanium oxide or beads contained in the white printed layers constituting the light-scattering regions 22 is increased, reflection becomes dominant over scattering. Conversely, if the particle size is reduced, scattering becomes dominant over reflection.

Next, the structure of the light-scattering regions 22 comprising convex dots will be explained with reference to FIGS. 4 and 5.

Convex dots constituting the light-scattering regions 22 project hemispherically from the side surfaces 12*c*. The hemispherical convex dots, for example, have a diameter of 100 μm and are spaced from each other at intervals of 200 μm. The convex dots can be formed together with the light guide plate 12 when it is formed by injection molding.

Figure 4:
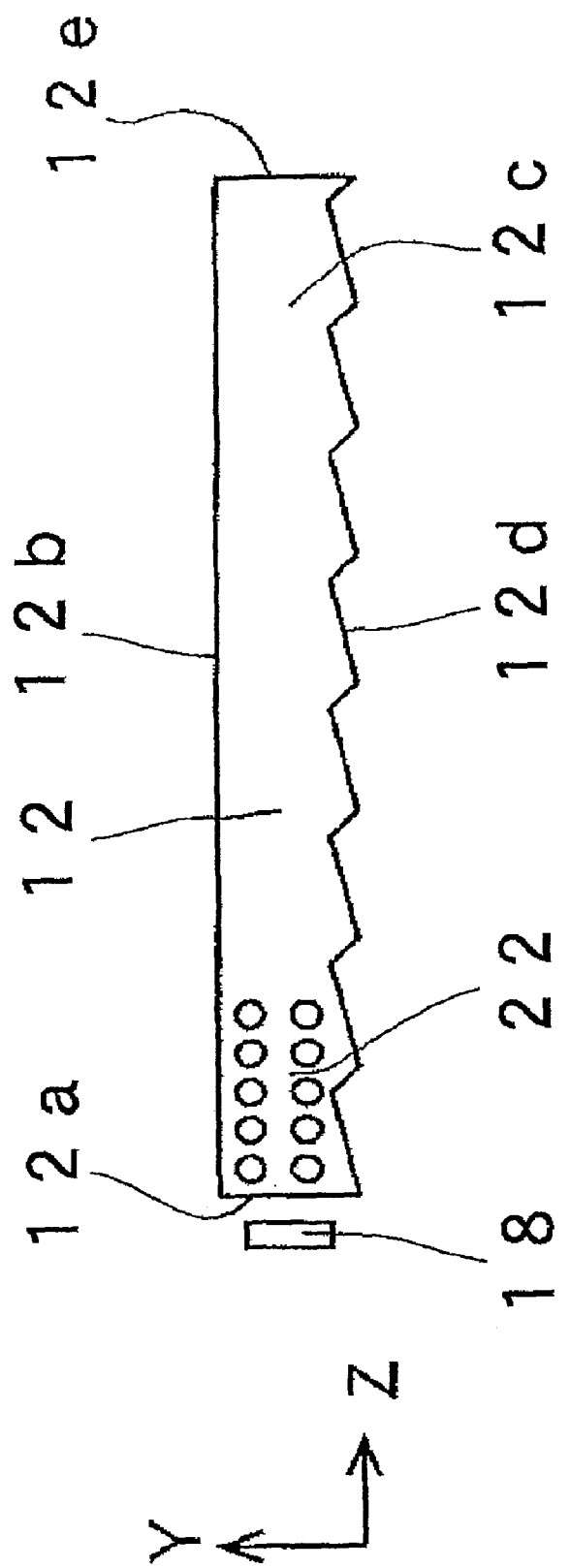
FIG. 4 is a side view showing a light guide plate and light-emitting diodes of a backlight unit according to a first embodiment of the present invention.
Figure 5:
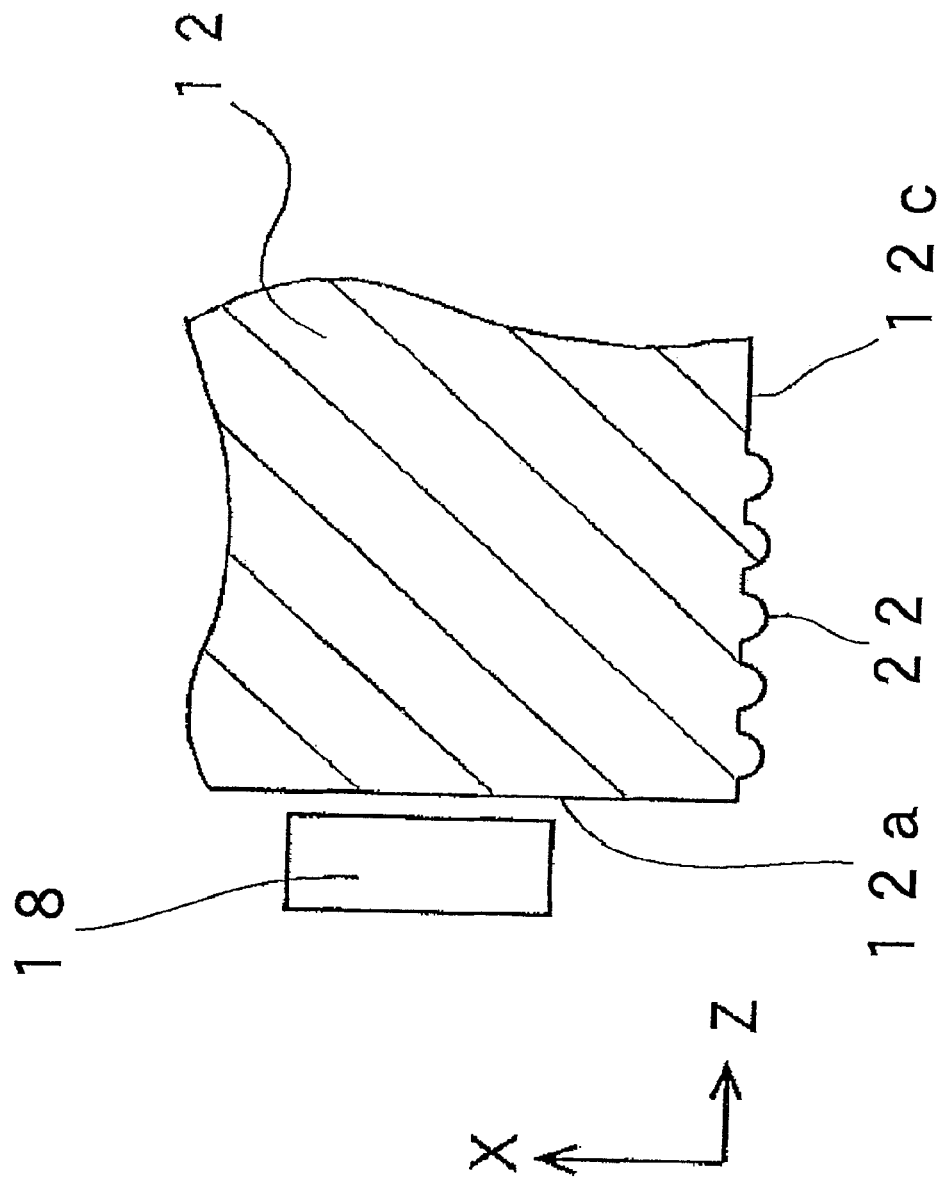
FIG. 5 is a fragmentary enlarged sectional view showing a part of the light guide plate and the light-emitting diodes of the backlight unit of FIG. 4.

The convex dots may have not only a hemispherical shape as shown in FIGS. 4 and 5 but also an elliptical shape, a pyramidal shape, or a conical shape.

Next, the structure of the light-scattering regions 22 comprising concave dots will be explained with reference to FIGS. 4 and 6.

Figure 6:
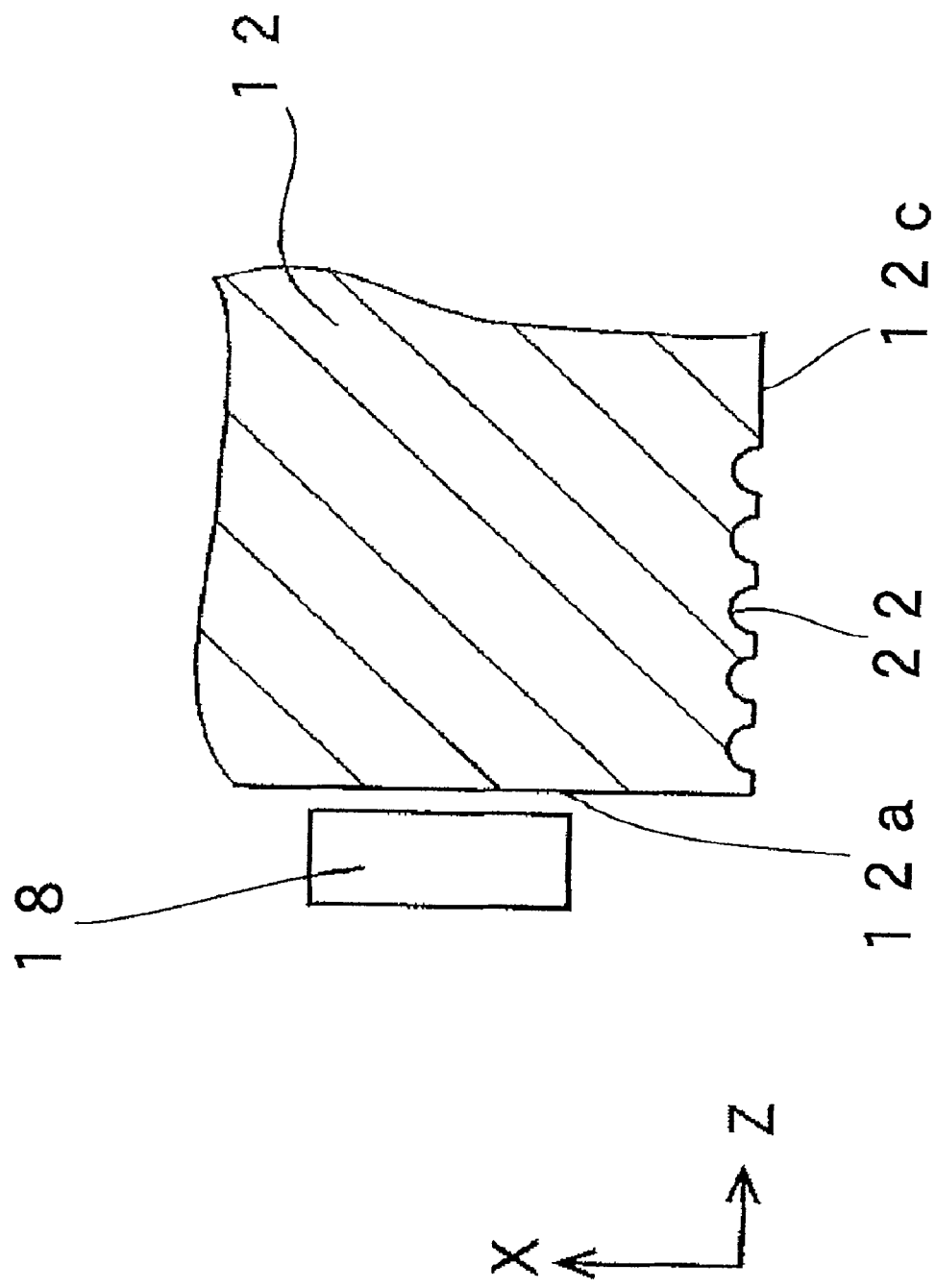
FIG. 6 is a fragmentary enlarged sectional view showing a part of a light guide plate and light-emitting diodes of a backlight unit according to a second embodiment of the present invention.

Concave dots constituting the light-scattering regions 22 hemispherically project inward of the light guide plate 12, as shown in FIG. 6. For example, the hemispherical concave dots have a diameter of 100 μm and are spaced from each other at intervals of 200 μm.

The concave dots may have not only a hemispherical shape as shown in FIG. 6 but also an elliptical shape, a pyramidal shape such as a quadrangular pyramidal shape, or a conical shape.

FIG. 7 shows another structural example of the light-scattering regions 22. As illustrated in the figure, the light-scattering regions 22 are uneven surfaces having a sawtooth sectional configuration. The ridges between the respective adjacent grooves constituting the uneven surface extend parallel to the Y axis direction. The sawtooth-shaped surfaces reflect and scatter light emitted from the light-emitting diodes 18 thereby back toward the light entrance surface 12a. The scattering and reflecting effect at the light-scattering regions 22 can be adjusted by varying the angle of slopes of the uneven surfaces or the pitch thereof.

Next, the prism sheet 14 will be explained.

The prism sheet 14 has a prism surface with prisms having a triangular sectional configuration in a side plan view thereof that faces the light exit surface 12b of the light guide plate 12. The prism sheet 14 functions such that light exiting the light exit surface 12b impinges substantially perpendicularly on a liquid crystal display panel (not shown) disposed to face the prism sheet 14.

The prism surface formed on the prism sheet 14 has a prism apex angle of 60 to 70 degrees. The prism sheet 14 is disposed so that the prism ridges of the prism surface are parallel to the X axis as shown by the dashed lines in FIG. 2. The pitch between the prism ridges is preferably 50 μm to 100 μm. If the pitch of the prism ridges exceeds 100 μm, the ridges appear undesirably on the light-emitting surface of the backlight unit 10 when it emits light.

The prism sheet 14 can be formed by injection-molding a transparent resin material such as polymethylmethacrylate, polycarbonate, or polyester.

The reflecting sheet 16, which is disposed to face the lower surface 12d of the light guide plate 12, returns light exiting the lower surface 12d, the side surfaces 12c and the rear surface 12e back into the light guide plate 12, thereby increasing the light utilization efficiency and enhancing the luminance of the backlight unit 10. The reflecting sheet 16 preferably has a reflecting surface made of a thin film of high reflectance, e.g. aluminum or silver, formed on a resin film surface by vapor deposition or plating. The reflecting sheet 16 may be made of a white polyethylene terephthalate (PET) film that irregularly reflects light at the surface thereof, in place of the above-described thin film of high surface reflectivity index.

In the backlight unit 10 of the present invention, light from the light-emitting diodes 18 enters the light guide plate 12 through the light entrance surface 12a. A part of light entering the light guide plate 12 at positions near the side surfaces 12c of the light guide plate 12 will impinge on the light-scattering regions 22 of the side surfaces 12c and is scattered and reflected by the light-scattering regions 22. Therefore, most of light incident thereon is reflected toward the rear surface (12e) of the light guide plate. In the present invention, much of light incident on the light-scattering regions 22 is scattered and reflected toward the light source side, i.e. toward the light entrance surface 12a. Therefore, it allows light to reach regions on the light guide plate 12 that are near the light-scattering regions 22 and the light entrance surface 12a. Thus, these regions, which are likely to appear dark in the conventional light guide plates, can be substantially prevented from becoming dark.

Accordingly, the backlight unit using the light guide plate of the present invention can substantially prevent the occurrence of luminance unevenness on the light-emitting surface of the backlight unit. Thus, it is possible to provide a planar light source of uniform luminance.

It should be noted that the housing 20 is made from a resin material and is shaped into a quadrangular cylinder, one end of which is open and the other end of which is closed. The reflecting sheet 16 is attached to the bottom inside the housing 20 by using double-coated adhesive tape of about 0.03 mm in thickness. The light guide plate 12 is secured to the housing 20 by engagement between engaging projections (not shown) provided on the light guide plate 12 and grooves (not shown) formed on the housing 20. The prism sheet 14 is mounted over the light exit surface 12b of the light guide plate 12 and secured in this position.

It should be noted that the present invention is not necessarily limited to the foregoing embodiments but can be modified in a variety of ways without departing from the gist of the present invention.

What is claimed is:

1. A light guide plate comprising:
   an upper surface;
   a lower surface opposite to said upper surface; and a peripheral edge surface between respective peripheral edges of said upper surface and lower surface;
   said peripheral edge surface having:
      a light entrance surface;
      two opposite side surfaces extending from opposite lateral side edges of said light entrance surface substantially normal to said light entrance surface; and
      an opposite surface opposite to said light entrance surface;
      wherein said two opposite side surfaces have respective light-scattering regions adjacent to said light entrance surface to scatter and reflect light entering said light guide plate through said light entrance surface and reaching said light-scattering regions, and
      wherein said light-scattering regions comprise white printed surfaces.

2. The light guide plate of claim 1, wherein said light-scattering regions are formed in respective regions of said side surfaces that extend on a predetermined length from the lateral edges of said light entrance surface.

3. A backlight unit comprising:
   the light guide plate of claim 1; and
   a plurality of light-emitting diodes provided to face said light entrance surface and spaced from each other in a width direction of said light entrance surface to apply light to said light entrance surface.

4. The backlight unit of claim 3, wherein said light-scattering regions are formed in respective regions of said side surfaces that extend over a predetermined length from the lateral edges of said light entrance surface, said predetermined length being not less than a distance between one of said lateral edges of said light entrance surface and one of said light-emitting diodes that is closest to said one of said lateral edges.

5. A backlight unit comprising:
   the light guide plate of claim 2; and
   a plurality of light-emitting diodes provided to face said light entrance surface and spaced from each other in a width direction of said light entrance surface to apply light to said light entrance surface.

6. A backlight unit comprising:
   a light guide plate, the light guide plate comprising:
      an upper surface;
      a lower surface opposite to said upper surface; and
      a peripheral edge surface between respective peripheral edges of said upper surface and lower surface;

said peripheral edge surface having:
   a light entrance surface; and
   two opposite side surfaces extending from opposite lateral side edges of said light entrance surface substantially normal to said light entrance surface; and
an opposite surface opposite to said light entrance surface;
   wherein said two opposite side surfaces have respective light-scattering regions adjacent to said light entrance surface to scatter and reflect light entering said light guide plate through said light entrance surface and reaching said light-scattering regions;
a plurality of light-emitting diodes provided to face said light entrance surface and spaced from each other in a width direction of said light entrance surface to apply light to said light entrance surface;
   wherein said light-scatting regions are formed in respective regions of said side surfaces that extend over a predetermined length from the lateral edges of said light entrance surface, said predetermined length being not less than a distance between one of said lateral edges of said light entrance surface and one of said light-emitting diodes that is closest to said one of said lateral edges.

7. The backlight unit of claim 6, wherein said light-scattering regions are coarse surfaces.

8. The backlight unit of claim 6, wherein said light-scattering regions are white printed surfaces.

* * * * *